United States Patent [19]

Ohta et al.

[11] Patent Number: 5,319,045

[45] Date of Patent: Jun. 7, 1994

[54] COPOLYMER AND COMPOSITION CONTAINING THE COPOLYMER

[75] Inventors: Takayuki Ohta, Kanagawa; Hiroaki Yamaoka, Yokohama; Junichi Gotoh, Kawasaki; Shiho Sano, Machida, all of Japan

[73] Assignee: Mitsubishi Kasei Corporation, Tokyo, Japan

[21] Appl. No.: 70,210

[22] Filed: Jun. 2, 1993

[51] Int. Cl.$^5$ ............................................. C08F 18/02
[52] U.S. Cl. ................................. 526/292.2; 526/293; 526/307; 526/310; 526/312; 526/313; 526/321; 526/326; 526/274; 526/279; 526/286
[58] Field of Search ................... 522/292.2, 292.1, 293, 522/307, 312, 321, 326, 279, 274, 286, 310, 313

[56] References Cited

U.S. PATENT DOCUMENTS 5,132,383  7/1992  Larson et al. ................... 526/292.2

*Primary Examiner*—Joseph L. Schofer
*Assistant Examiner*—Jeffrey T. Smith
*Attorney, Agent, or Firm*—Oblon, Spivak, McClelland, Maier & Neustadt

[57] ABSTRACT

A copolymer having repeating units of the following formula (I) and repeating units of the formula (II), wherein the ration of (I) to (II) is within a range of from 10:90 to 90:10 by weight ratio, and the number average molecular weight is at least 1,000, or the intrinsic viscosity $\eta_{inh}$ is at least 0.02:

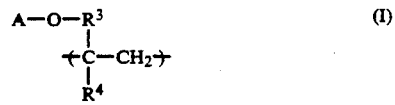

wherein A is a polyester unit having a polymerization degree of from 2 to 200, $R^3$ is a bivalent organic group having an ester, urethane or ketone bond, and $R^4$ is a hydrogen atom or a methyl group,

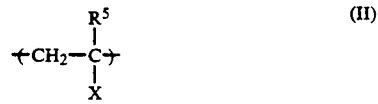

wherein $R^5$ is a hydrogen atom or a methyl group, and X is a substituent having functionality.

5 Claims, No Drawings

COPOLYMER AND COMPOSITION CONTAINING THE COPOLYMER

BACKGROUND OF THE INVENTION

1. Field of the Invention

The present invention relates to ester-type copolymers useful for resin modifiers for e.g. water repellency, adhesives, compatibilizing agents or dispersants, and processes for their production.

2. Discussion of the Prior Art

In recent years, copolymers such as graft polymers and block polymers having different structures in one molecule, have attracted an attention as functional materials. For example, graft polymers become useful for e.g. resin modifiers for e.g. water repellency or antistatic property, adhesives, compatibilizing agents or dispersants by introducing into the side chains structures which are entirely different from the main chains. However, in order to obtain such functions to the maximum extent, a technology is required to accurately design the structures of the main chains and the side chains depending upon the particular purpose and to control the polymerization precisely. For this purpose, a method has, for example, been known in which a monomer having a high molecular weight having polymerizable functional groups at its terminals, is prepared and copolymerized with other monomer. As such examples, polyethers such as polyethylene oxide or vinyl polymers such as methacrylic acid esters may, for example, be mentioned. However, the compatibility with various resins was not adequate.

Accordingly, it is an object of the present invention to present a novel copolymer having a component derived from a vinyl-type monomer having various functions, as the main chain and a polyester component as the side chain, which is excellent in the affinity to many resins and which has various functions depending upon the particular purposes. By using such a copolymer, it is readily possible to obtain, for example, a resin composition having e.g. a high antistatic property and a molded product thereof, or a coating agent or adhesive or the like for molded products.

SUMMARY OF THE INVENTION

As a result of an extensive study for the above object, the present inventors have found a copolymer having repeating units of the following formula (I) and repeating units of the formula (II), wherein the ratio of (I) to (II) is within a range of from 10:90 to 90:10 by weight ratio, and the number average molecular weight is at least 1,000, or the intrinsic viscosity $\eta_{inh}$ is at least 0.02:

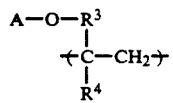

wherein A is a polyester unit having a polymerization degree of from 2 to 200, $R^3$ is a bivalent organic group having an ester, urethane or ketone bond, and $R^4$ is a hydrogen atom or a methyl group,

wherein $R^5$ is a hydrogen atom or a methyl group, and X is a substituent having functionality.

DESCRIPTION OF THE PREFERRED EMBODIMENTS

Now, the present invention will be described in detail.

The copolymer of the present invention is a copolymer comprising repeating units of the above formula (I) and repeating units of the formula (II). More specifically, (I) is repeating units represented by the following formula (I-1) or (I-2):

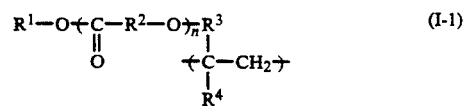

wherein $R^1$ is a $C_{1-20}$ alkyl group or aralkyl group, $R^2$ is a bivalent aliphatic hydrocarbon group, $R^3$ is a bivalent organic group having an ester, urethane or ketone bond, $R^4$ is a hydrogen atom or a methyl group, and n is from 2 to 200,

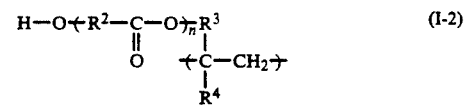

wherein $R^2$ is a bivalent aliphatic hydrocarbon group, $R^3$ is a bivalent organic group having an ester, urethane or ketone bond, $R^4$ is a hydrogen atom or a methyl group, and n is from 2 to 200.

Such copolymers of the present invention can be produced by radical-polymerizing a polyester macromonomer of the following formula (III) or (V) and a vinyl-type monomer of the following formula (IV) in a weight ratio of (III) or (V) to (IV) of from 10:90 to 90:10 in the presence of a radical polymerization initiator:

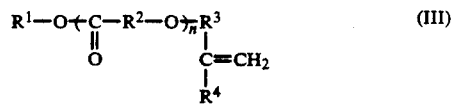

wherein $R^1$ is a $C_{1-20}$ alkyl group or aralkyl group, $R^2$ is a bivalent aliphatic hydrocarbon group, $R^3$ is a bivalent organic group having an ester, urethane or ketone bond, $R^4$ is a hydrogen atom or a methyl group, and n is from 2 to 200,

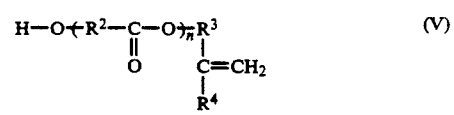

wherein $R^2$ is a bivalent aliphatic hydrocarbon group, $R^3$ is a bivalent organic group having an ester, urethane or ketone bond, R⁴ is a hydrogen atom or a methyl group, and n is from 2 to 200,

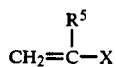 (IV)

wherein R⁵ is a hydrogen atom or a methyl group, and X is a substituent having functionality.

The polyester macromonomer of the formula (III) will be described in detail. The following may be mentioned as preferred examples of the polyester macromonomer (III):

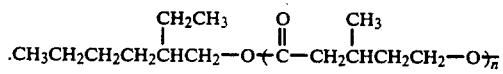

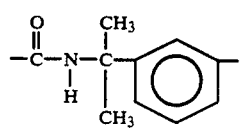

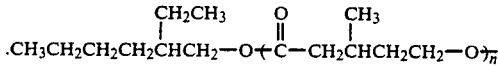

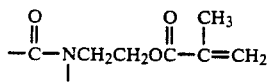

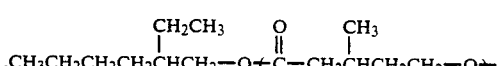

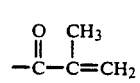

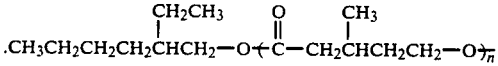

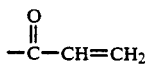

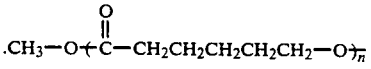

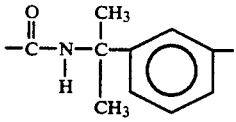

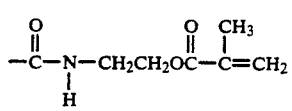

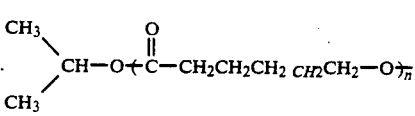

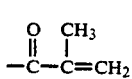

-continued

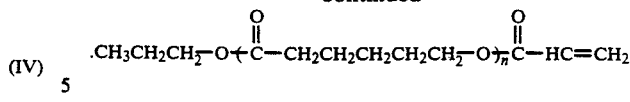

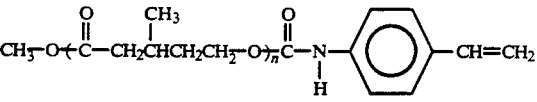

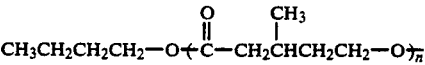

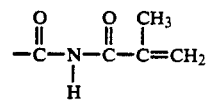

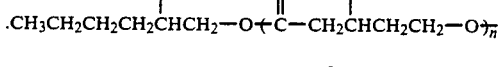

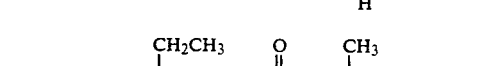

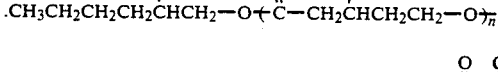

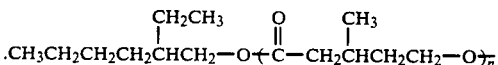

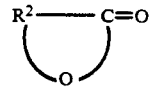

The production of the polyester macromonomer (III) usually comprises the following two steps.

Namely, in the first step, a lactone compound of the formula:

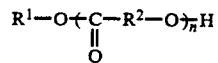

wherein R² is as defined in the formula (III), is ring-open polymerized using an alcohol compound of the formula R1-OH wherein R¹ is as defined in the formula (III), as the initiator, to obtain the following polyester alcohol:

$$R^1-O(\!\!-\!\!C\!\!-\!\!R^2\!\!-\!\!O\!\!-\!\!)_n H$$
$$\phantom{R^1-O(\!\!-\!\!C\!\!}\underset{O}{\|}$$

In this case, the alcohol compound as the initiator may, for example, be methanol, n-butanol, n-hexanol, n-octanol or 2-ethylhexanol.

Further, as the lactone compound, a $C_{3-8}$ lactone is preferred, and ε-caprolactone, β-methyl-δ-valerolactone or β-ethyl-δ-valerolactone is particularly preferred. This reaction is conducted usually in the presence of a catalyst. As the catalyst, a known catalyst used for ring-opening polymerization of a lactone, e.g. a mineral acid such as sulfuric acid or phosphoric acid, an alkali metal such as lithium, sodium or potassium, an alkali metal compound such as n-butyl lithium, or a metal alkoxide such as titanium tetrabutoxide, may, for example, be used.

This reaction can be conducted without any solvent. However, a solvent may be employed. As the solvent, toluene, xylene, methyl ethyl ketone, methyl isobutyl ketone, tetrahydrofuran, chloroform or carbon tetrachloride may, for example, be used.

The reaction can be suitably conducted under such conditions that the temperature is within a range of from 0° C. to 200° C. and the reaction time is from 10 minutes to hours. Here, the number n of repeating units can be controlled by the molar ratio of the initiator to the lactone compound and is from 2 to 200.

Then, the second step is a step of reacting the above-mentioned resulting polyester alcohol with a compound of the following formula (VI) or (VII):

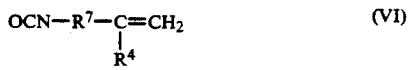
(VI)

wherein (VI) is as defined above, $R^7$ is —CO—, —

—$C(CH_3)_2$—Ar— or —Ar—, wherein Ar is a phenylene group which may have a substituent, and m is an integer of from 1 to 8,

(VII)

wherein $R^4$ is as defined above, Y is a halogen atom, a $C_{1-8}$ alkoxy group or acyloxy group.

The following compounds may be mentioned as specific examples of the compound of the above formula (VI) or (VII):

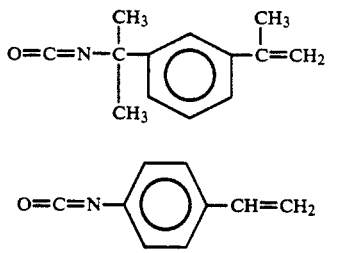

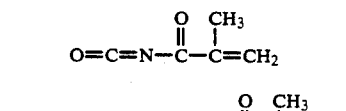

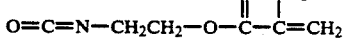

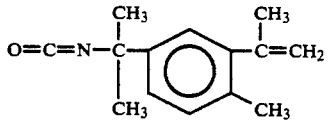

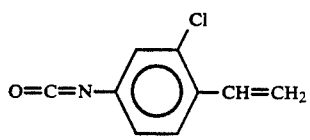

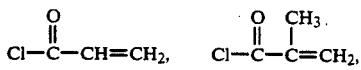

-continued

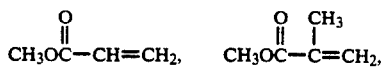

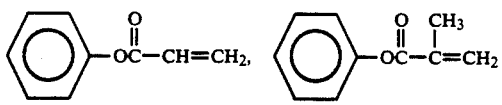

The reaction of the above-mentioned polyester alcohol with the above-mentioned (VII) is a urethane bond-forming reaction, and these reactants may be reacted in equimolar. The reaction may proceed without any catalyst. However, to increase the reaction rate, a tin catalyst such as dibutyltin dilaurate, dibutyltin dioctoate or dibutyltin mercaptide may be employed.

The reaction of the above-mentioned polyester alcohol with the above-mentioned (VII) is a condensation reaction or an ester exchange reaction, and these reactants may be reacted also in equimolar. When the condensation reaction is employed, hydrogen halide will be produced as a byproduct, and therefore, an acid binding agent such as a tertiary amine may be used, or the reaction may be conducted in an inert gas stream. When the ester exchange reaction is employed, a known ester exchange catalyst such as a mineral acid such as hydrochloric acid or sulfuric acid, a salt of a metal such as zinc, calcium or magnesium, or a metal alkoxide such as titanium tetrabutoxide, may be used.

A solvent may be used for these reactions. As the solvent, toluene, xylene, methyl ethyl ketone, methyl isobutyl ketone, tetrahydrofuran, chloroform or carbon tetrachloride may, for example, be used. The reaction can be suitably conducted under such conditions that the temperature is within a range of from 0° C. to 200° C. and the reaction time is from 30 minutes to 50 hours.

Now, the polyester macromonomer of the formula (V) will be described in detail.

In the formula (V), $R^2$ is a bivalent aliphatic hydrocarbon group, preferably a branched or linear $C_{3-8}$ aliphatic hydrocarbon group. Specifically, it corresponds to the aliphatic hydrocarbon group of a polyester formed by the ring-opening polymerization of a lactone compound as described hereinafter. The following are preferred:

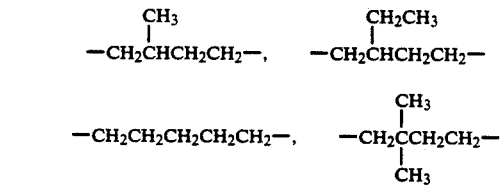

$R^3$ is preferably

wherein m is an integer of from 1 to 8.

$R^4$ is a hydrogen atom or a methyl group.

n representing the polymerization degree of the polyester structure is usually from 2 to 200. However, from the viewpoint of the affinity at the time of mixing to other resin, it is preferably from 2 to 100, more preferably from 2 to 50.

The following may be mentioned as preferred examples of the above polyester macromonomer.

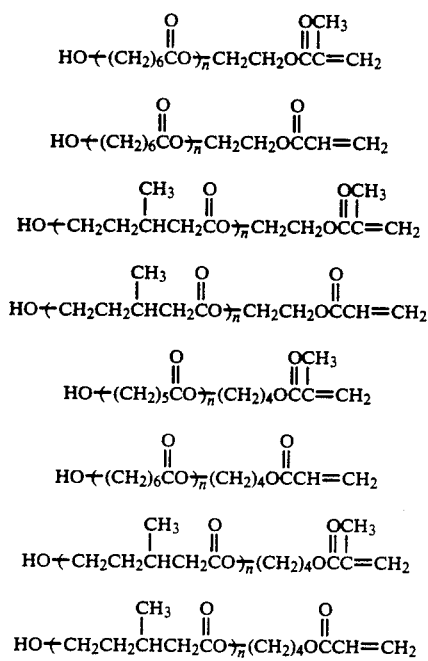

The polyester macromonomer (V) can be produced in the same manner as in the case of (III). A typical example will be given as follows:
Using the compound of the formula:

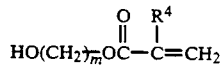

wherein $R^4$ and m are as defined above, as an initiator, a lactone compound of the formula:

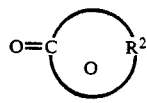

wherein $R^2$ is as defined above, is subjected to ring-opening polymerization to obtain the following polyester macromonomer:

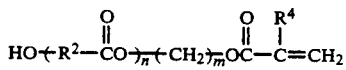

The above initiator may, preferably, be hydroxyethyl acrylate, hydroxy methacrylate, hydroxypropyl methacrylate or hydroxybutyl methacrylate. Further, as the lactone compound, a $C_{3-8}$ lactone is preferred, and ε-caprolactone, β-methyl-δ-valerolactone or β-ethyl-δ-valerolactone is particularly preferred.

The reaction is conducted usually in the presence of a catalyst. As the catalyst, a known catalyst used for the ring-opening polymerization of a lactone, for example, a mineral acid such as sulfuric acid or phosphoric acid, an alkali metal such as lithium, sodium or potassium, an alkyl metal compound such as n-butyl lithium, a metal alkoxide such as titanium tetrabutoxide, or a tin compound such as dibutyltin dilaurate, may, for example, be used.

This reaction may be conducted without any solvent. However, a solvent may be used as the case requires. As the solvent, toluene, xylene, methyl ethyl ketone, methyl isobutyl ketone, tetrahydrofuran, chloroform or carbon tetrachloride may, for example, be used. The reaction can be suitably conducted under such conditions that the temperature is within a range of from 0° C. to 200° C., and the reaction time is from 10 minutes to 30 hours.

Here, the number n of repeating units can be controlled by the molar ratio of the initiator to the lactone compound and is at a level of from 2 to about 200.

The vinyl-type monomer of the formula (IV) is a conventional radical-polymerizable monomer. In the formula, $R^5$ is a hydrogen atom or a methyl group, and X is a substituent having functionality and is an ionic residue containing a quaternary ammonium salt or a metal salt, a nonionic hydrophilic group composed of pyrrolidone or a polyethylene oxide having a polymerization degree of from 1 to 200, a substituent containing a $C_{4-20}$ perfluoroalkyl group or a 1-200 siloxane bonds, or a substituent having a functional group selected from the group consisting of a hydrolyzable silyl group, a benzotriazole, a hindered amine, a benzophenone, a hindered phenol, a phosphoric acid ester, an aromatic sulfonyl, an aromatic imine, an aromatic nitrogen, an aromatic halogen.

With respect to the functions based on X, a hydrophilic nature, water repellency, dispersibility, adhesive property, ultraviolet absorbing property, oxidation resistance or antibacterial property may be obtained depending upon the characteristics of the chemical structure of X.

With respect to specific examples of the vinyl monomer of the formula (IV), as a monomer having an ionic group, a quaternary product of a nitrogen-containing monomer such as dimethylaminoethyl (meth)acrylate, diethylaminoethyl (meth)acrylate, dipropylaminoethyl (meth)acrylate, diisopropylamino (meth)acrylate, dibutylaminoethyl (meth)acrylate, dimethylaminopropyl (meth)acrylate, diethylaminovinyl sulfide, a diethylaminoethylvinyl ether, vinylbenzyl-N,N-dimethylamine, vinyl pyridine or vinyl quinoline having a cationic group, may be mentioned. This quaternary product can be obtained by a conventional method by reacting an inorganic acid Such as hydrogen chloride, hydrogen bromide or sulfuric acid or a quaternary conversion agent such as benzyl chloride, benzyl bromide, methyl chloride or methyl bromide to the tertiary amino group. The step for the quaternary conversion may be conducted at any stage i.e. at a stage of the monomer prior to the copolymerization or after the polymerization. Further, as the monomer having an anionic group, a vinyl-type monomer having a carboxyl group, a sulfonic acid group or a phosphoric acid group, such as (meth)acrylic acid, α-chloro(meth)acrylic acid, vinyl sulfonic acid, sulfonated styrene, 2-acryloamide-2-methylpropane sulfonic acid, sulfomethyl (meth)acrylate, 2-sulfoethyl (meth)acrylate, 3-sulfoethyl (meth)acrylate, 3-sulfopropyl (meth)acrylate, allyl sulfonic acid, 1-phenylvinyl sulfonic acid, acid phosphooxyethyl (meth)acrylate, 3-chloro-2-amidephosphooxypropyl (meth)acrylate or acid phosphooxypropyl (meth)acrylate, or an alkali metal salt, an ammonium salt or an organic amine salt such as a dimethyl amine, triethyl amine or triethanol amine salt thereof, or a tetrabutylphosphonium salt thereof. Among these, when a metal salt or an organic salt is to be used, the corresponding monomer may be used directly for polymerization, or it may be polymerized at the stage of an organic acid monomer, followed by neutralization.

Every one of the copolymers of the present invention prepared by using such monomers is expected to provide an antistatic property when coated on or mixed with a resin. However, preferred is a copolymer prepared from a monomer containing a quaternary ammonium salt.

When kneaded with various thermoplastic or thermosetting resins or coated on their surface, the copolymers obtained by the present invention are capable of lowering the electrical resistance of the resins and providing excellent antistatic properties. Further, they have side chains having high compatibility with various resins, whereby they are excellent in the adhesion to the resins and compatibility therewith, and such properties last for a long period of time without change.

When the copolymer of the present invention is to be kneaded with a resin, the copolymer of the present invention is incorporated in an amount of from 0.1 to 200 parts by weight, preferably from 0.1 to 50 parts by weight, more preferably from 0.1 to 20 parts by weight, per 100 parts by weight of the resin.

Further, when the copolymer of the present invention is coated on a resin, it may be used in the form of its solution. However, various resins may be used in combination as binders to improve the strength, the texture of the coating film, etc. Namely, when an antistatic resin composition having the copolymer of the present invention incorporated in an amount of from 0.1 to 200 parts by weight to 100 parts by weight of a binder resin composed of a thermoplastic or thermosetting resin which will be described hereinafter, is coated in the form of a solution, it is possible to obtain a coating film having both types of resins uniformly dissolved or dispersed, and it is thereby possible to obtain a coating film having the strength and the adhesive property further improved. By selecting a proper binder and a blending ratio, the antistatic agent containing such a binder is capable of forming a uniform transparent coating film, and yet it is possible to obtain an antistatic effect equal to a case where the copolymer was coated alone in spite of the fact that the ion concentration will substantially be low.

There is no particular restriction as to the thermoplastic resin to be used here, so long as it is soluble in a solvent, and it may suitably be selected depending upon the type of the substrate to be coated. For example, polyvinyl chloride, polyester, polyamide, poly(meth)acrylic acid ester or polyurethane, may, be mentioned. Such a resin and a high molecular weight antistatic agent of the present invention may be dissolved in a solvent common to both, and the solution may be coated on the substrate, followed by drying to readily form an antistatic coating film.

Further, in a case where high strength and high chemical resistance are required by the coating film, a thermosetting resin can be used as a binder. Namely, a high molecular weight antistatic agent of the present invention may be mixed to a polyol commonly employed in the urethane industry, and the mixture is further blended with a curing agent containing an isocyanate compound. Then, the mixture is coated on a substrate, cured and dried to form a coating film having superior abrasion resistance and high durability. In such a case, additives such as a solvent and a curing catalyst, which are commonly used in the urethane industry, may be used.

Further, in a case where a quick-drying highly hard coating film is required, it is effective to use a ultraviolet curable resin in combination. Namely, a high molecular weight antistatic agent of the present invention may be blended to a known ultraviolet curable resin composition, and the blend is coated on a substrate, followed by curing with ultraviolet rays in accordance with a conventional method, whereby a coating film having a good surface property can be obtained in a short period of time. There is no particular restriction as to the ultraviolet curable resin to be used here, and single functional monomers such as butyl (meth)acrylate, tetrahydrofurfuryl (meth)acrylate and vinyl pyrrolidone, and polyfunctional oligomers such as polyurethane acrylate and polyester acrylate, may be used in a proper combination in accordance with a conventional method.

The copolymer of the present invention shows high compatibility with such various binder resins, whereby a uniform coating film can be formed. The coating film thus formed by an antistatic resin composition of the present invention, is free from tackiness, transparent and tough and is excellent in the durability. Further, even when it is washed with water, its surface resistance undergoes no change.

Further, as a vinyl-type monomer having a nonionic hydrophilic group, N-vinylpyrrolidone, hydroxyethyl (meth)acrylate, hydroxypropyl (meth)acrylate or an ethyleneglycol (meth)acrylate of the following formula, may be mentioned:

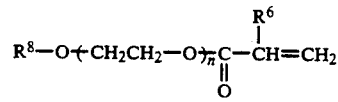

wherein $R^8$ is a $C_{1-20}$ alkyl group, $R^5$ is hydrogen or a methyl group, and n is an integer of from 1 to 200.

The copolymer of the present invention prepared from such a monomer, is capable of imparting a hydrophilic nature, when coated on or kneaded with a resin.

Further, the following structures may be mentioned for the monomer having a perfluoroalkyl group:

A polyfluoroalkyl group-containing (meth)acrylate such as:
$CF_3(CF_2)_4CH_2OCOC(CH_3)=CH_2$,
$CF_3(CF_2)_6(CH_2)_2OCOC(CH_3)=CH_2$,
$(CF_3)_2CF(CF_2)_5(CH_2)_2OCOCH=CH_2$,
$CF_3(CF_2)_6(CH_2)_7(CH_2)_4OCOCH=CH_2$,
$CF_3(CF_2)_4CH_2CH_2OCONHCH_2C-$
  $H_2OCOC(CH_3)=CH_2$,
$CF_3(CF_2)_7SO_2N(C_3H_7)(CH_2)_2OCOCH=CH_2$,
$CF_3(CF_2)_7SO_2N(C_3H_7)(CH_2)_2OCOC(CH_3)=CH_2$,
$CF_3(CF_2)_7CONH(CH_2)_2OCOCH=CH_2$,
$CF_3(CF_2)_7CONH(CH_2)_2OCOC(CH_3)=CH_2$,
$H(CF_2)_{10}CH_2OCOCH=CH_2$,
$CF_2Cl(CF_2)_{10}CH_2OCOCH=CH_2$;

A polyfluoroalkyl group-containing vinyl ether such as:
$CF_3(CF_2)_3CH_2CH_2OCH_2CH_2OCH=CH_2$,
$(CF_3)_2CF(CF_7)CH_2CH_2OCH=CH_2$,
$(CF_3)_2CF(CF_2)_7CH_2CH_2OCH_2CH_2OCH=CH_2$,
$CF_3(CF_2)_5CH_2CH_2OCH=CH_2$, $H(CF_2)_{10}CH_2CH_2OCH=CH_2$; and A perfluoroalkyl group-substituted (α-methyl)styrene such as:

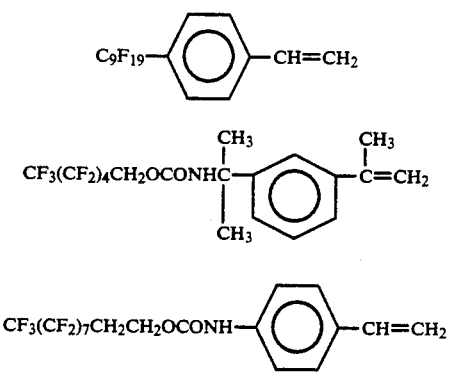

Further, a fluorine-containing vinyl monomer such as $CHF=CF_2$, $CHCl=CFCl$, $CHF=CF_2$, $CF_2=C(CF_3)_2$, $CF_3CH=CH_2$ or $C_3F_7CH=CH_2$ may also be use.

As the monomer having a substituent containing a siloxane bond, the following may be mentioned:

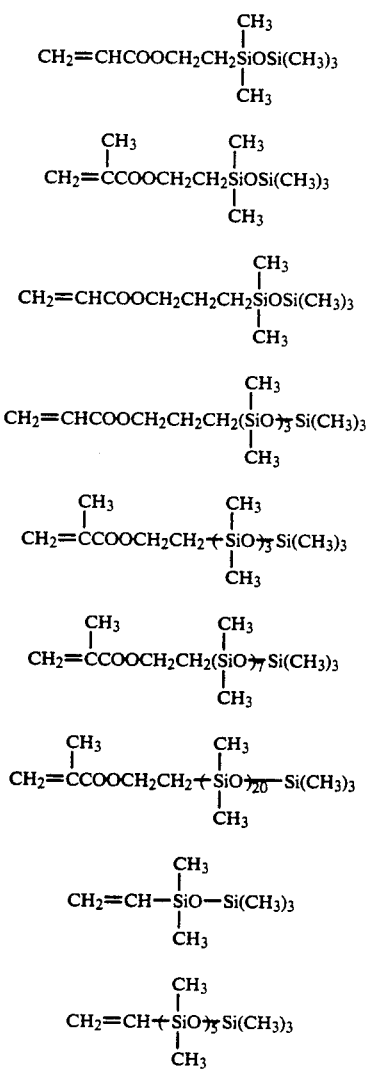

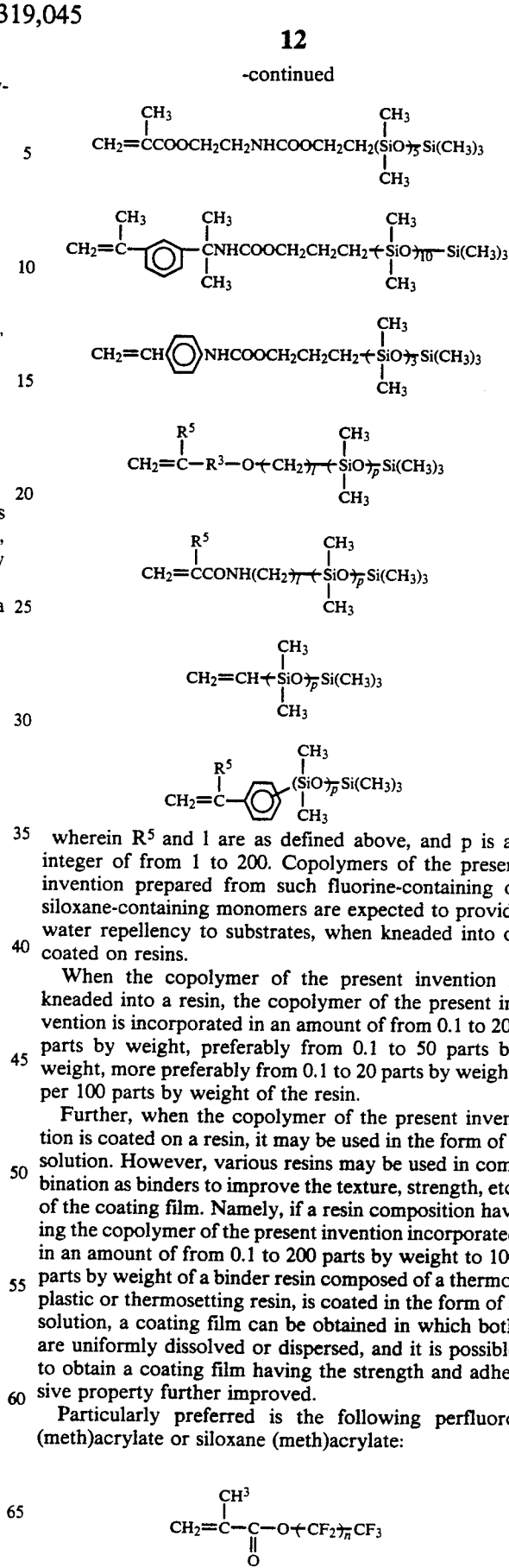

wherein $R^5$ and $l$ are as defined above, and $p$ is an integer of from 1 to 200. Copolymers of the present invention prepared from such fluorine-containing or siloxane-containing monomers are expected to provide water repellency to substrates, when kneaded into or coated on resins.

When the copolymer of the present invention is kneaded into a resin, the copolymer of the present invention is incorporated in an amount of from 0.1 to 200 parts by weight, preferably from 0.1 to 50 parts by weight, more preferably from 0.1 to 20 parts by weight, per 100 parts by weight of the resin.

Further, when the copolymer of the present invention is coated on a resin, it may be used in the form of a solution. However, various resins may be used in combination as binders to improve the texture, strength, etc. of the coating film. Namely, if a resin composition having the copolymer of the present invention incorporated in an amount of from 0.1 to 200 parts by weight to 100 parts by weight of a binder resin composed of a thermoplastic or thermosetting resin, is coated in the form of a solution, a coating film can be obtained in which both are uniformly dissolved or dispersed, and it is possible to obtain a coating film having the strength and adhesive property further improved.

Particularly preferred is the following perfluoro (meth)acrylate or siloxane (meth)acrylate:

$$CH_2=C(CH_3)-C(=O)-O-(CF_2)_n-CF_3$$

wherein n is an integer of from 6 to 10.

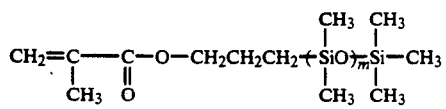

wherein m is an integer of from 1 to 10.

Further, as the monomer having a hydrolyzable silyl group, vinyl trimethoxysilane, vinyl triethoxysilane, vinyl dimethoxymethylsilane, vinyl diethoxymethylsilane, vinyl triacetoxysilane, vinyl methyldiacetoxysilane, 3-methacryloxypropyltrimethoxysilane or 3-methacryloxypropylmethyldimethoxysilane may, for example, be mentioned. Every one of the copolymers of the present invention prepared from these monomers, is expected to improve the dispersibility of an inorganic filler or to improve the adhesive property to a metal or the like, when kneaded into a resin. Preferred are 3-methacryloxypropylmethyldimethoxysilane and 3-methacryloxypropyltrimethoxysilane. As examples of the monomers having benzotriazole, hindered amine and benzophenone, the following structures may be mentioned, respectively:

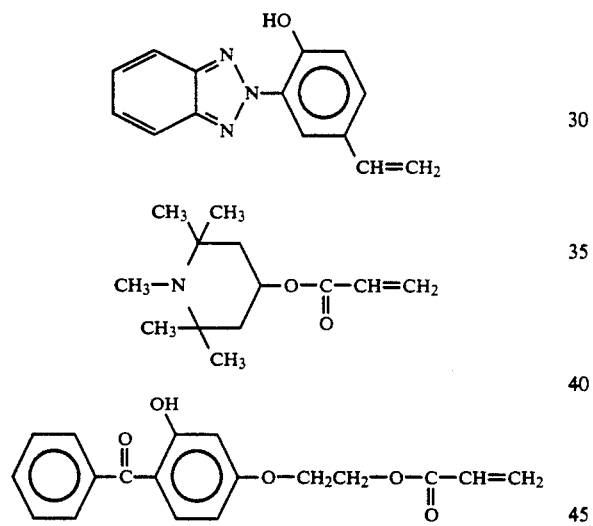

Each of the copolymers of the present invention prepared from these monomers has an ultraviolet absorbing property, and when added to a resin, is free from bleed out and will maintain the property for a long period of time, as is different from a common low molecular weight additive. When the copolymer of the present invention is kneaded into a resin, the copolymer of the present invention is incorporated in an amount of from 0.1 to 200 parts by weight, preferably from 0.1 to 50 parts by weight, more preferably from 0.1 to 20 parts by weight, per 100 parts by weight of the resin.

Further, when the copolymer of the present invention is coated on a resin, it may be used in the form of a solution. However, various resins may be used in combination as binders to improve the texture, strength, etc. of the coating film. Namely, when a resin composition having the copolymer of the present invention incorporated in an amount of from 0.1 to 200 parts by weight to 100 parts by weight of a binder resin composed of a thermoplastic or thermosetting resin is coated in the form of a solution, a coating film in which both are uniformly dissolved or dispersed, can be obtained, and it is possible to obtain a coating film having the strength and adhesive property further improved. Further, as the monomers containing a hindered phenol, a phosphoric acid ester, an aromatic sulfonyl or an aromatic imine, the following structures may be mentioned:

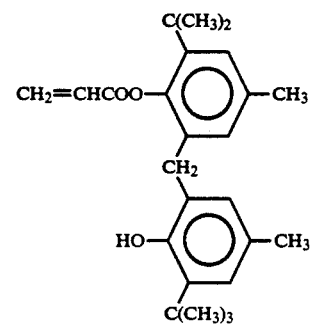

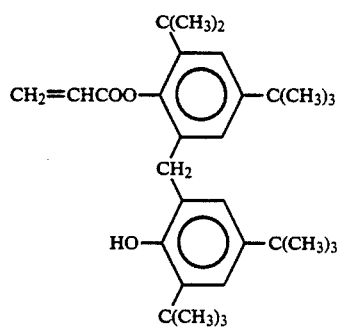

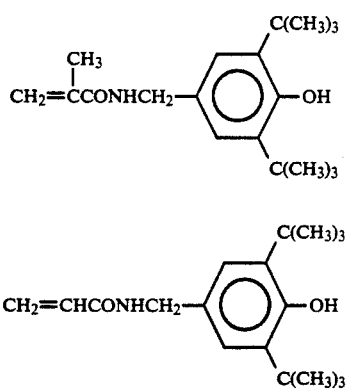

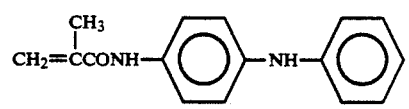

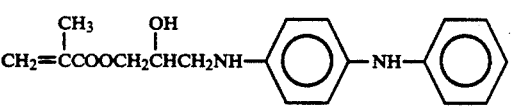

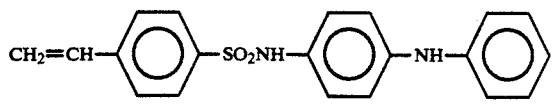

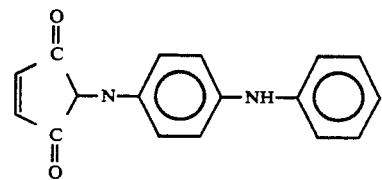

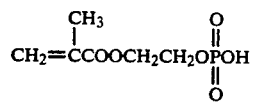

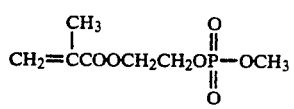

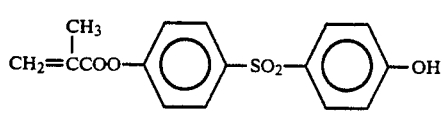

Each of the copolymers of the present invention prepared from these monomers, has an anti-oxidizing property and, when added to a resin, is free from bleed out and will maintain the property for a long period of time, as is different from a common low molecular weight additive.

Further, as the aromatic nitrogen-containing or aromatic halogen-containing monomer, the following structures may be mentioned:

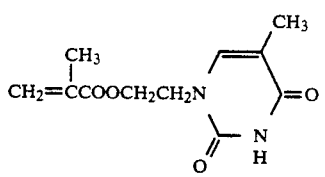

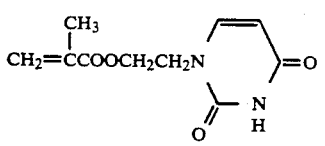

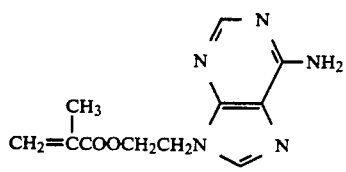

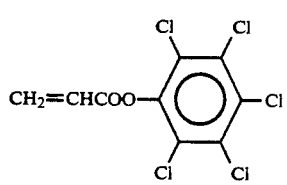

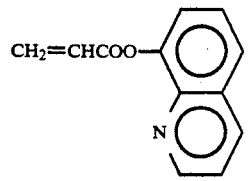

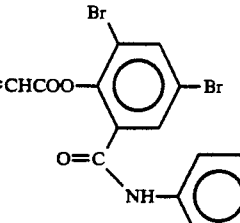

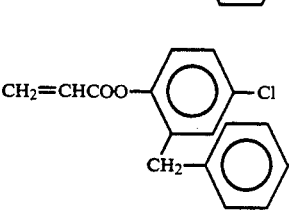

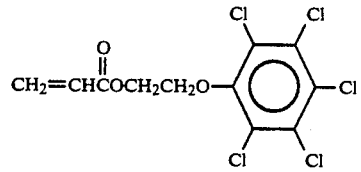

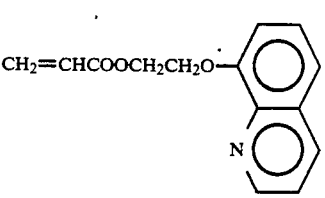

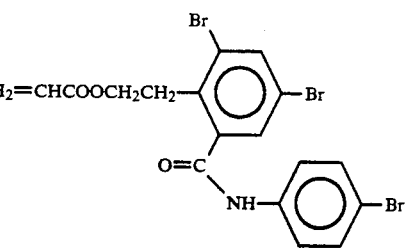

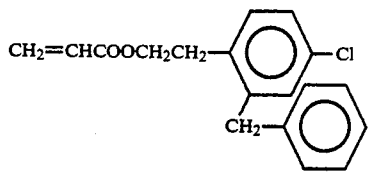

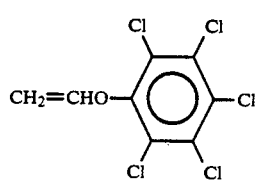

-continued

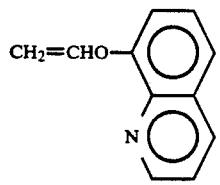

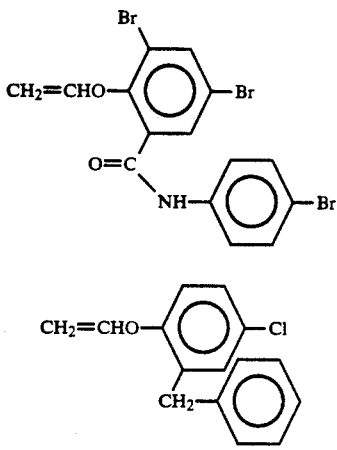

The copolymers of the present invention prepared from these monomers have antibacterial activities and when added to or coated on a resin, provide effects of controlling germination of fungi on a substrate for a long period of time.

Copolymerization of the polyester macromonomer (III) or (V) with the vinyl-type monomer (IV) can readily be conducted by a conventional radical polymerization method. Namely, it can be suitably conducted at a temperature of from 0° C. to 200° C. for from 1 hour to 24 hours usually by adding from 0.1 to 10 wt % of an azo compound or a radical polymerization initiator such as a peroxide to the polyester macromonomer (III) or (V) and the vinyl-type monomer (IV).

Further, here, a chain transfer agent such as an alkylmercaptan may be added to control the degree of polymerization. As the polymerization method, any one which is commonly employed for radical polymerization, such as bulk polymerization, solution polymerization, emulsion polymerization or suspension polymerization, may be employed.

Further, here, the ratio of the polyester macromonomer (III) or (V) to the vinyl-type monomer (IV) is within a range of from 10:90 to 90:1, preferably from 20:80 to 80:20, by weight-ratio. If the ratio of the vinyl-type monomer (IV) is smaller than 10, it tends to be difficult to obtain the antistatic property, hydrophilic nature, water repellency, dispersibility, adhesive property, ultraviolet absorbing property, anti-oxidizing property and antibacterial activities, as functions attributable to the performance of the side chains in the vinyl-type monomer. Further, if the ratio of the polyester macromonomer (III) or (V) is smaller than 10, the affinity when mixed with other resins, tends to be poor, whereby not only it is difficult to uniformly disperse it, but in order to obtain the expected properties, it will be required to add a larger amount of the copolymer, such being undesirable.

Further, in the copolymer of the present invention, a part of the above polyester macromonomer and the vinyl type monomer can be replaced by other monomer. Such other monomer may, for example, be styrene, vinyl acetate, or a (meth)acrylic acid ester derived from a $C_{1-20}$ alcohol. The amount to be substituted is not more than 50 wt %, preferably not more than 40 wt %, of the entirety. If this amount exceeds 50 wt %, various functions and the compatibility to other resins, which are characteristics of the copolymer of the present invention, will be impaired, such being undesirable.

Further, as a method for measuring the molecular weight of a polymer, it is common to adopt a GPC method or measurement of the viscosity of the solution. However, the copolymers of the present invention have various substituents ranging from lipophilic to hydrophilic substituents on the main chains, whereby it is impossible to perform the GPC or the measurement of the viscosity of the solution with a single solvent for all the copolymers, for the measurement of the molecular weights. Therefore, the molecular weight of the copolymer of the present invention is defined by either the molecular weight assumed by the GPC method or the value of the intrinsic viscosity. Namely, the molecular weight of the copolymer of the present invention is such that the number average molecular weight as calculated as polystyrene by the GPC method using tetrahydrofuran as a solvent is at least 1,000, preferably at least 2,000, or the intrinsic viscosity at 25° C. (the solvent is suitably selected from e.g. N-methylpyrrolidone, a methanol/methyl ethyl ketone solvent mixture, or the like) is at least 0.02, preferably at least 0.05.

As described in the foregoing, the copolymers having ester chains of specific structures of the present invention at the side chains, are excellent in the affinity to various thermoplastic resins, whereby the main chain structures can be selected depending upon the particular purposes, and thus they can be used for a wide range of applications, for example, as resin modifiers, dispersing agents or compatibilizing agents. Thus, they are industrially very useful.

EXAMPLES

Now, the present invention will be described in further detail with reference to Examples. However, it should be understood that the present invention is by no means restricted by the following Examples, unless they extend beyond the gist of the present invention.

REFERENCE EXAMPLE (A)

Preparation of a Polyester Alcohol

A flask equipped with a stirrer, a dropping funnel and a gas inlet, was adequately flushed with dry nitrogen. Then, 5.7 g of 2-ethylhexanol and 0.1 g of metal sodium were charged and stirred, whereby metal sodium was dissolved. Then, this flask was immersed in an oil bath of 40° C., and 50 g of β-methyl-δ-valerolactone was dropwise added from the dropping funnel, under stirring. One hour later, stirring was stopped, and the content of the flask was taken out and dissolved in 50 ml of purified chloroform. This solution was put into 100 ml of deionized water and washed to separate the chloroform layer. This washing was repeated once more. Then, the solvent was distilled off under reduced pressure from this chloroform solution, to obtain a colorless transparent polyester alcohol. This product had a hydroxyl value of 58.6 KOHmg/g and an acid value of 0.03 KOHmg/g.

REFERENCE EXAMPLE (B)

Preparation of a Polyester Macromonomer

Into a reactor equipped with a stirrer and a reflux condenser, 20.00 g of the polyester alcohol prepared in (A), 4.25 g of m-isopropenyl-α,α'-dimethylbenzylisocyanate and 0.12 g of dibutyltin dioctoate (1% toluene solution) were charged, heated to 80° C. and reacted for 9 hours. The IR spectrum and H-NMR of the product were measured, whereby it was confirmed that a polyester macromonomer having the following structure was obtained:

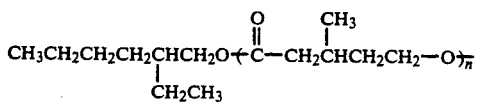

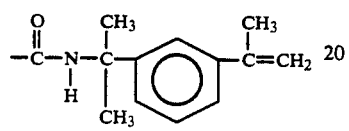

REFERENCE EXAMPLE (C)

Preparation of a Polyester Alcohol

A polyester alcohol was obtained in the same manner as in Reference Example A except that β-methyl-δ-valerolactone was changed to ε-caprolactone. This product had a hydroxyl value of 56.78 KOHmg/g and an acid value of 0,50 KOHmg/g.

REFERENCE EXAMPLE (D)

Preparation of a Polyester Macromonomer

A polyester macromonomer was prepared in the same manner as in Reference Example B except that the amount of the charge of m-isopropenyl-α,α'-dimethylbenzylisocyanate was changed to 4.11 g.

REFERENCE EXAMPLE (E)

Preparation of a Polyester Macromonomer

Into a reactor equipped with a stirrer and a reflux condenser, 22.8 g of ε-caprolactone was charged and heated to 140°. 2.6 g of 2-hydroxyethyl methacrylate, 0.03 g of tin octinoate and 0.02 g of hydroquinonemonomethyl ether were added thereto over a period of 10 minutes and then heated and reacted at 140° C. for 6 hours.

This product had a hydroxyl value of 55.4 KOHmg/g and an acid value of 0.07 KOttmg/g.

The IR spectrum and H-NMR of this product were measured, whereby it was confirmed that a polyester macromonomer having the following structure was obtained:

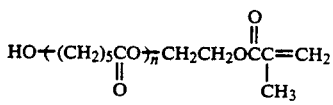

REFERENCE EXAMPLE (F)

Preparation of a Polyester Macromonomer

A flask equipped with a stirrer, a dropping funnel and a gas inlet, was adequately flushed with dry nitrogen. Then, 13 g of 2-hydroxylmethacrylate and 0.4 g of metal sodium were charged and stirred, whereby metal sodium was dissolved. Then, this flask was immersed in an oil bath of 40° C., and 100 g of β-methyl-δ-valerolactone was dropwise added thereto from the dropping funnel under stirring. One hour later, stirring was stopped, and the content of the flask was taken out and dissolved in 500 ml of chloroform. This solution was put into 500 ml of deionized water and washed to separate a chloroform layer. This washing was repeated once more. Then, the solvent was distilled off under reduced pressure from the chloroform solution, to obtain a colorless transparent polyester macromonomer. This product had a hydroxyl value of 58.1 KOHmg/g and an acid value of 0.04 KOHmg/g.

The IR spectrum and H-NMR of this product were measured, whereby it was confirmed that the following macromonomer was obtained:

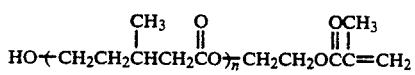

REFERENCE EXAMPLE (G)

Preparation of a Random Copolymer

Into a flask equipped with a stirrer, a reflux condenser and a gas inlet, 10.0 g of methyl methacrylate, 10.0 g of methacryloyloxyethyltrimethylammonium chloride and 0.9 g of azobisisobutyronitrile were charged, and 13 g of toluene and 7 g of n-hexane were further added as solvents, to obtain a uniform solution, followed by polymerization at 80° C. for 8 hours under a nitrogen stream. After the polymerization, the reaction solution was poured into methanol to precipitate the product, which was thoroughly washed with methanol and dried. The yield was substantially 100%.

EXAMPLE 1

Into a flask equipped with a stirrer, a reflux condenser and a gas inlet, 10.0 g of the polyester macromonomer prepared in Reference Example B, 10.0 g of a silicone-type macromonomer Sylerplane FM0711 (average molecular weight: 1,000, manufactured by Chisso K.K.), 10.0 g of methyl methacrylate and 0.9 g of azobisisobutyronitrile were charged, and 13 g of toluene and 7 g of n-hexane were further added as solvents, to obtain a uniform solution, followed by polymerization at 80° C. for 8 hours under a nitrogen stream.

After the polymerization, the reaction solution was poured into methanol to precipitate the product, which was thoroughly washed with methanol and dried. The yield was 48%. Further, the number average molecular weight as calculated as polystyrene by GPC, was 16,000. IR of the obtained polymer was measured, whereby absorption by Si-O was observed at 700 cm$^{-1}$ and 1,050 cm$^{-1}$, absorption by Si—C. was observed at 800 cm$^{-1}$ and absorption by —NH— was observed at 3,400 cm$^{-1}$ and from NMR, a peak of H of —CH$^3$ was observed at 0 ppm, a peak of H of a benzene ring was observed at 7.2 ppm, a peak attributable to —COOCH$_2$— was observed at 3.8 to 4.2 ppm and a peak attributable to —COOCH$_3$ was observed at 3.6 ppm, whereby the product was confirmed to be a three component copolymer of the polyester macromonomer, the silicone-type macromonomer and methyl methacrylate.

EXAMPLE 2

Into the same flask as used in Example 1, 5.0 g of the polyester macromonomer prepared in Reference Example B, 5.0 g of (3-methacryloxypropyl)-1,1,3,3,3—pentamethyldisiloxane, 0.03 g of azobisisobutyronitrile and 7 g of toluene were charged to obtain a uniform solution, followed by polymerization at 70° C. for 8 hours under a nitrogen stream. After the polymerization, the reaction solution was poured into methanol to precipitate the product, which was thoroughly washed with methanol and dried. The yield was 78%. Further, the number average molecular weight as calculated as polystyrene by GPC. was 16,000. IR of the obtained polymer was measured, whereby absorption by Si-O was observed at 700 cm$^{-1}$ and 1,050 cm$^{-1}$ and absorption by —NH— was observed at 3,400 cm$^{-1}$ and from NMR, a peak of H of Si—CH$_3$ was observed at 0 ppm, a peak of H of a benzene ring was observed at 7.2 ppm, and a peak attributable to —COOCH$_2$— was observed at 3.8 to 4.2 ppm, whereby the product was confirmed to be a copolymer of the polyester macromonomer and (3-methacryloxypropyl)-1,1,3,3,3-pentamethyldisiloxane.

EXAMPLE 3

Into the same flask as used in Example 1, 5.0 g of the polyester macromonomer prepared in Reference Example B, 5.0 g of (3-methacryloxypropyl)-1,1,3,3,3-pentamethyldisiloxane, 5.0 g of methyl methacrylate, 0,045 g of azobisisobutyronitrile and 7 g of toluene were charged to obtain a uniform solution, followed by polymerization at 70° C. for 8 hours under a nitrogen stream. After the polymerization, post treatment was conducted in the same manner as in Example 1 to obtain a product. The yield was 85%. Further, the number average molecular weight as calculated as polystyrene by GPC. was 25,000. IR of the obtained polymer was measured, whereby absorption by Si-O was observed at 700 cm$^{-1}$ and 1,050 cm$^{-1}$ and absorption by —NH— was observed at 3,400 cm$^{-1}$ and from NMR, a peak of H of Si-CH$_3$ was observed at 0 ppm, a peak of H of a benzene ring was observed at 7.2 ppm, and a peak attributable to —COOCH$_2$— was observed at 3.8 to 4.2 ppm, whereby the product was found to be a three component copolymer of the polyester macromonomer, (3-methacryloxypropyl)-1,1,3,3,3-pentamethyldisiloxane and methyl methacrylate.

EXAMPLE 4

Into the same flask as used in Example 1, 10.0 g of the polyester macromonomer prepared in Reference Example B, 10.0 g of (3-methacryloxypropylmethyldimethoxysilane, 0.06 g of azobisisobutyronitrile and 15 g of toluene were charged to obtain a uniform solution, followed by polymerization at 70° C. for 8 hours under a nitrogen stream. After the polymerization, post treatment was conducted in the same manner as in Example 1 to obtain a product. The yield was 80%. Further, the number average molecular weight as calculated as polystyrene by GPC. was 20,300. IR of the product was measured, whereby absorption by Si—O was observed at 700 cm$^{-1}$ and 1,060 cm$^{-1}$ and absorption by —Si—O—CH$_3$ was observed at 823 cm$^{-1}$, and absorption by —NH— was observed at 3,400 cm$^{-1}$, and from NMR, a peak of H of Si—CH$_3$ was observed at 0 ppm, and a peak attributable to H of a benzene ring was observed at 7.2 ppm, whereby the product was confirmed to be a copolymer of the polyester macromonomer and 3-methacryloxypropylmethyldimethoxysilane.

EXAMPLE 5

Into the same flask as used in Example 1, 10.0 g of the polyester macromonomer prepared in Reference Example B, 10.0 g of (3-methacryloxypropylmethyldimethoxysilane, 10.0 g of methyl methacrylate, 0.09 g of azobisisobutyronitrile and 20 g of toluene were charged to obtain a uniform solution, followed by polymerization at 70° C. for 8 hours under a nitrogen stream. After the polymerization, post treatment was conducted in the same manner as in Example 1 to obtain a product. The yield was 87%. Further, the number average molecular weight as calculated as polystyrene by GPC. was 230,000. IR of the product was measured, whereby absorption by Si—O —CH$_3$ was observed at 823 cm$^{-1}$ and absorption by —NH— was observed at 3,600 cm$^{-1}$ and from NMR, a peak of H of Si—H$_3$ was observed at 0 ppm, a peak of H of a benzene ring was observed at 7.2 ppm, and a peak attributable to —COOCH$_2$— was observed at 3.8 to 4.2 ppm, whereby the product was confirmed to be a three component copolymer of the polyester macromonomer, 3-methacryloxypropylmethyldimethoxysilane and methyl methacrylate.

EXAMPLE 6

Into the same flask as used in Example 1, 5.0 g of the polyester macromonomer prepared in Reference Example B, 5.0 g of (2-perfluorooctylethyl)methacrylate, 0.03 g of azobisisobutyronitrile and 7 g of toluene were charged to obtain a uniform solution, followed by polymerization at 70° C. for 8 hours under a nitrogen stream. After the polymerization, post treatment was conducted in the same manner as in Example 1 to obtain a product. The yield was 75%. Further, the number average molecular weight as calculated as polystyrene by GPC. was 17,000. IR of the product was measured, whereby absorption by C—F was observed at 660 cm$^{-1}$ and 830 cm$^{-1}$ and absorption by —NH— was observed at 3,460 cm$^{-1}$, and from NMR, a peak of H of a benzene ring was observed-at 7.2 ppm, and a peak attributable to the proton of —COOCH$_2$— was observed at 3.9 to 4.2 ppm, whereby the product was confirmed to be a copolymer of the polyester macromonomer and (2-perfluorooctylethyl)methacrylate.

EXAMPLE 7

Into the same flask as used in Example 1, 15.0 g of the polyester macromonomer prepared in Reference Example B, 15.0 g of N-vinylpyrrolidone, 15.0 g of 2-hydroxyethyl methacrylate, 0.045 g of azobisisobutyronitrile and 30 g of toluene were charged to obtain a uniform solution, followed by polymerization at 70° C. for 8 hours under a nitrogen stream. After the polymerization, post treatment was conducted in the same manner as in Example 1 to obtain a product. The yield was insoluble in tetrahydrofuran but soluble in N-methylpyrrolidone. [$\eta$] measured in a N-methylpyrrotidone solution was 0.35 (15° C.). IR of the product was measured, whereby large absorption attributable to a OH group was observed at 3,300 cm$^{-1}$ and from NMR, a peak of H of a benzene ring was observed at 7.3 ppm, and a peak of H of a hydroxyl group was observed at 3.8 ppm, a peak of H of —N—CH— was observed at 3.2 ppm, a peak of H of —COCH$_2$— was observed at 2.3 ppm and a peak attributable to H of —COOCH$_2$— was observed at 4.0 to 4.2 ppm, whereby this product was confirmed to be a three component copolymer of the polyester macromonomer, N-methylpyrrolidone and 2-hydroxyethyl methacrylate.

EXAMPLE 8

Into the same flask as used in Example 1, 10.0 g of the polyester macromonomer prepared in Reference Example B, 10.0 g of 4-methacryloyloxyethyl-2-hydroxybenzophenone, 0.2 g of azobisisobutyronitrile, 0.2 g of n-dodecylmercaptan and 20 g of tetrahydrofuran were charged, followed by polymerization at 70° C. for 8 hours under a nitrogen stream. After the polymerization, post treatment was conducted in the same manner as in Example 1 to obtain a product. The yield was 91%. Further, the number average molecular weight as calculated as polystyrene by GPC. was 28,400. IR of the product was measured, whereby absorption attributable to a -NH group and a —OH group was observed at 3,300 cm$^{-1}$ and from NMR, peaks of H of a benzene ring were observed at 6.3 ppm, 7.1 ppm and 7.4 to 8.6 ppm, and a peak attributable to H of —COOCH$_2$— was observed at 3.8 to 4.2 ppm, whereby this product was confirmed to be a three component copolymer of the polyester macromonomer and 4-methacryloyloxyethyl-2-hydroxybenzophenone.

EXAMPLE 9

Into the same flask as used in Example 1, 10.0 g of the polyester macromonomer prepared in Reference Example B, 10.0 g of 1,2,2,6,6-pentamethyl-4-piperidyl methacrylate, 0.2 g of azobisisobutyronitrile, 0.2 g of n-dodecylmercaptan and 20 g of toluene were charged, followed by polymerization at 70° C. for 7 hours under a nitrogen stream. After the polymerization, post treatment was conducted in the same manner as in Example 1 to obtain a product. The yield was 60%. Further, the number average molecular weight as calculated as polystyrene by GPC. was 3,000. IR of the product was measured, whereby an absorption attributable to a —NH group was observed at 3,400 cm$^{-1}$ and an absorption by —N—CH$_3$ was observed at 2,800 cm$^{-1}$ and from NMR, a peak of H of a benzene ring was observed at 7.2 ppm, a peak of H of —COOCH$_2$— was observed at 3.9 to 4.2 ppm, a peak of H of —COOCH$_3$ was observed at 3.6 ppm and a peak attributable to H of —N—CH$_3$ was observed at 1.2 ppm, whereby this product was found to be a three component copolymer of the polyester macromonomer, 1,2,2,6,6-pentamethyl-4-piperidyl methacrylate and methyl methacrylate.

EXAMPLE 10

Into the same flask as used in Example 1, 15.0 g of the polyester macromonomer prepared in Reference Example B, 15.0 g of polyethyleneglycol methacrylate (Plenmer PE-200, manufactured by Nippon Oil and Fats Co., Ltd.), 0.15 g of azobisisobutyronitrile and 20 g of toluene were charged to obtain a uniform solution, followed by polymerization at 70° C. for 9 hours under a nitrogen stream. From GPC. of the reaction solution, no substantial peaks were detected which correspond to the polyester macromonomer and polyethyleneglycol methacrylate as the starting materials. Further, also from NMR of the product, no substantial peaks attributable to the proton at the β-position of the isopropenyl group at the molecular terminal of the polyester macromonomer as the starting material or the proton at the β-position of the methacryloyl group of the vinyl monomer, was observed. From the above results, the degree of polymerization was confirmed to be substantially 100%. It is a known fact that the isopropenylbenzene as a functional group at the terminal of the polyester macromonomer undergoes no homopolymerization at this polymerization temperature, and therefore, this product is a copolymer of the polyester macromonomer and the polyethyleneglycol methacrylate. Further, from GPC, the number average molecular weight of this copolymer as calculated as polystyrene was 63,000.

EXAMPLE 11

Into the same flask as used in Example 1, 10.0 g of the polyester macromonomer prepared in Reference Example B, 10.0 g of methacryloyloxyethyltrimethylammonium chloride 0.2 g of azobisisobutyronitrile, 0.4 g of n-dodecylmercaptan and 40 g of isopropyl alcohol were charged and polymerized under a nitrogen stream at 70° C. for 7 hours and then at 95° C. for two hours. After the polymerization, isopropanol was distilled off, followed by drying under reduced pressure.

From NMR of the product, peaks at 5.1 ppm and 5.3 ppm attributable to the proton at the β-position of the isopropenyl group of the molecular terminal of the polyester macromonomer as the starting material and peaks at 5.7 ppm and 6.2 ppm attributable to the proton at the β-position of the methacryloyl group of the vinyl monomer were slightly observed. By comparing the integrated intensity ratio of such peaks to the peak (7.3 ppm) of H of a benzene ring and the peak (4.5 ppm) of H of an ammonium methylene, the degree of polymerization was confirmed to be about 95%. [η] of this copolymer measured in a solvent mixture of methanol/methyl ethyl ketone=3/7, was 0.1 (30° C.).

EXAMPLE 12

Into a flask equipped with a stirrer, a reflux condenser and a gas inlet, 10.0 g of the polyester macromonomer prepared in Reference Example B, 10.0 g of methacryloyloxyethyltrimethylammonium chloride, 0.2 g of azobisisobutyronitrile, 0.4 g of n-dodecylmercaptan and 40 g of isopropyl alcohol were charged and polymerized under a nitrogen stream at 70° C. for 7 hours and further at 95° C. for two hours. After the polymerization, isopropanol was distilled off, followed by drying under reduced pressure. $\eta_{inh}$ of the copolymer thereby obtained was 0.15 dl/g.

This copolymer was dissolved in a mixed solution of methyl ethyl ketone/methanol in a weight ratio of 7/3, so that the concentration would be 1 wt %, and the solution was coated on a soft polyvinyl chloride sheet (GA-405, manufactured by Mitsubishi Kasei Vinyl Company) by means of a #8 bar coater. This sheet was heated at 110° C. for two hours to dry the solvent, whereupon the surface resistance was measured and found to be $8.5 \times 10^8$ Ω.

EXAMPLE 13

Into the same flask as used in Example 1, 10.0 g of the polyester macromonomer prepared in Reference Example B, 10.0 g of methacryloyloxyethyltrimethylammonium chloride, 0.2 g of azobisisobutyronitrile and 25 g of isopropyl alcohol were charged and polymerized under a nitrogen stream at 70° C. for 7 hours and further at 95° C. for two hours. After the polymerization, isopropanol was distilled off, followed by drying under reduced pressure. $\eta_{inh}$ was 0.15 dl/g.

This polymer was coated on a soft polyvinyl chloride sheet in the same manner as-in Example 12, whereupon the surface resistance was measured and found to be $8.0 \times 10^8$ Ω.

EXAMPLE 14

Into the same flask as used in Example 12, 40.0 g of the polyester macromonomer prepared in Reference Example B, 17.0 g of methacrylic acid, 0.6 g of azobisisobutyronitrile and 85 g of isopropyl alcohol were charged and polymerized under a nitrogen stream at 70° C. for 8 hours. After the polymerization, isopropanol was distilled off, followed by drying under reduced pressure. $\eta_{inh}$ was 0.11 dl/g.

20 g of this product was dissolved in 200 g of a solvent mixture of methyl ethyl ketone/methanol=7/3, and 41.6 g of a methanol solution containing 5% of KOH, was added thereto. The mixture was stirred at room temperature for one hour. After the reaction, the solvent was distilled off under reduced pressure to obtain 22 g of a product.

This polymer was coated on a soft polyvinyl chloride sheet in the same manner as in Example 1, whereupon the surface resistance was measured and found to be $6.5 \times 10^9$ Ω.

EXAMPLE 15

3 g of the copolymer obtained in Example 12 and 7 g of vinyl chloride resin powder (P-500, manufactured by Mitsubishi Kasei Vinyl Company) were dissolved in a mixed solution of methyl ethyl ketone/methanol=9/1 so that the concentration would be 10 wt %. This solution was cast on a glass sheet and dried at 70° C. for 6 hours to obtain a blend film having a thickness of 70 μm. This film was colorless and transparent, and the surface resistance was $2.4 \times 10^7$ Ω on both the front and rear sides.

Further, this film was washed with water for 5 minutes and dried at 110° C. for 3 minutes. This film was left to stand at room temperature for one day, whereupon the surface resistance was measured and found to be $3.4 \times 10^{-7}$ Ω.

EXAMPLES 16 AND 17

Using the copolymers obtained in Examples 13 and 14, blend films of vinyl chloride resins were, respectively, prepared in the same manner as in Example 15. Each of the films thus obtained was colorless and transparent, and the surface resistance was $1.8 \times 10^7$ Ω and $9.4 \times 10^7$ Ω, respectively.

EXAMPLE 18

The copolymer prepared in Example 12 and a polyvinylbutyral resin (Sekisui Kagaku Esrec BMS) were dissolved in ethanol in a blend ratio of 2/8 to obtain a solution having a concentration of 10 wt %. From this solution, a film having a thickness of 70 μm was prepared in the same manner as in Example 15. This film was colorless and transparent, and the surface resistance was $6.0 \times 10^9$ Ω.

EXAMPLE 19

The copolymer prepared in Example 12 and a polyester resin (Toyobo Byron 200) were dissolved in a ratio of 3/7 in a solvent mixture of tetrahydrofuran/methyl ethyl ketone/methanol=60/30/10 to obtain a solution having a concentration of 10 wt %. From this solution, a film having a thickness of 70 μm was prepared in the same manner as in Example 15. This film was colorless and transparent, and the surface resistance was $1.5 \times 10^7$ Ω.

EXAMPLE 20

The mixed solution of the copolymer prepared in Example 15 and the vinyl chloride resin, was coated on the same soft polyvinyl chloride sheet as used in Example 12 by a #5 bar coater and dried at 110° C. for two minutes. The obtained coating film was colorless and transparent, and the surface resistance was $2.4 \times 10^8$ Ω. This value did not change even after washing the film with water for five minutes.

EXAMPLE 21

3 g of the isopropanol solution of the copolymer obtained in Example 12 (resin solid content: 10 wt %) and 7 g of a polyurethane resin Sanpren IB-114B (resin solid content: 30 wt %, manufactured by Sanyo Kasei K.K.) were mixed. As a softening agent, 0.14 g of Coronate EH (manufactured by Nippon Polyurethane Co., Ltd.) was added thereto. Then, the mixture was coated on the same soft polyvinyl chloride film as used in Example 12 by a #5 bar coater. The coated film was cured at 70° C. for 3 hours, whereupon the surface resistance was measured and found to be $6.2 \times 10^9$ Ω. This value did not change even after washing with water for 5 minutes.

EXAMPLE 22

1.5 g of the methyl ethyl ketone/methanol (7/3) solution of the copolymer obtained in Example 12 (resin solid content: 10 wt %) and 3.5 g of a urethane acrylate type ultraviolet curable resin PR-202 (50% methyl ethyl ketone solution, manufactured by Mitsubishi Kasei Corporation) were mixed to obtain a solution having a resin solid content of 23 wt %. This solution was coated on the same soft polyvinyl chloride film as used in Example 1 by a #5 bar coater and cured by irradiating with an ultraviolet lamp of 120 W/cm for 12 seconds. The obtained coating film was colorless and transparent, and the surface resistance was $7.5 \times 10^7$ Ω. This value did not change even after washing with water for 5 minutes.

COMPARATIVE EXAMPLE 1

A blend film was prepared in the same manner as in Example 4 except that 4 g of the random copolymer obtained in Reference Example G and 6 g of a vinyl chloride resin powder (P-500, manufactured by Mitsubishi Kasei Corporation) were used. This film had slight turbidity, and the surface resistance was $4.1 \times 10^{14}$ Ω.

COMPARATIVE EXAMPLE 2

A polyvinyl chloride film containing a quaternary ammonium salt was prepared in the same manner as in Example 15 except that 1.5 g of each of the macromonomer and the quaternary ammonium salt type monomer as used in Example 12 was used instead of the copolymer prepared in Example 12. The surface of this film had tackiness, and the surface resistance immediately after the film formation was $1.3 \times 10^6$ Ω, but it increased to $2.0 \times 10^{12}$ Ω after washing with water for five minutes.

EXAMPLE 23

Into a flask equipped with a stirrer, a reflux condenser and a gas inlet, 10.0 g of the polyester macromonomer prepared in Reference Example E, 10.0 g of methacryloyloxyethyltrimethylammonium chloride, 0.2 g of azobisisobutyronitrile, 0.4 g of n-dodecylmercaptan and 40 g of isopropyl alcohol were charged and polymerized under a nitrogen stream at 70° C. for 7 hours and further at 95° C. for two hours. After the polymerization, isopropanol was distilled off, followed by drying under reduced pressure. $\eta_{inh}$ of the copolymer thereby obtained was 0.21 dl/g. 1 g of this copolymer and 9 g of a vinyl chloride resin powder (P-500, manufactured by Mitsubishi Kasei Vinyl Company) were dissolved in a mixed solution of methyl ethyl ketone/methanol=9/1 so that the concentration would be 10 wt %. This solution was cast on a glass sheet and dried at 70° C. for 6 hours to obtain a blend film having a thickness of 70 μm. The surface resistance of this film was $6.5 \times 10^{-7}$ Ωcm.

EXAMPLE 24

Into the same flask as used in Example 1, 10.0 g of the polyester macromonomer prepared in Reference Example F, 10.0 g of methacryloyloxyethyltrimethylammonium chloride, 0.2 g of azobisisobutyronitrile and 25 g of isopropyl alcohol were charged and polymerized under a nitrogen stream at 70° C. for 7 hours and further at 95° C. for two hours. After the polymerization, isopropanol was distilled off, followed by drying under reduced pressure. $\eta_{inh}$ was 0.17 dl/g. Then, a blend film with a vinyl chloride resin was prepared in the same manner as in Example 1. The surface resistance of the obtained film was $4.3 \times 10^7$ Ωcm.

EXAMPLE 25

Into the same flask as used in Example 1, 40.0 g of the polyester macromonomer prepared in Reference Example E, 17.0 g of methacrylic acid, 0.6 g of azobisisobutyronitrile and 85 g of isopropyl alcohol were charged and polymerized under a nitrogen stream at 70° C. for 8 hours. After the polymerization, isopropanol was distilled off, followed by drying under reduced pressure. $\eta_{inh}$ was 0.18 dl/g.

20 g of this product was dissolved in 200 g of a solvent mixture of methyl ethyl ketone/methanol=7/3, and 41.6 g of a methanol solution containing 5% of KOH was added thereto. The mixture was stirred at room temperature for one hour. After the reaction, the solvent was distilled off under reduced pressure to obtain 22 g of a product.

Then, in the same manner as in Example 1, a blend film with a vinyl chloride resin was prepared. The surface resistance of the obtained film was $4.1 \times 10^8$ Ωcm.

EXAMPLE 26

The copolymer prepared in Example 23 and a polyvinylbutyral resin (Sekisui Kagaku Esrec BMS) was dissolved in ethanol in a blend ratio of 2/8, to obtain a solution having a concentration of 10 wt %.

From this solution, a film having a thickness of 70 μm was prepared in the same manner as in Example 23. The volume resistance of this film was $8.3 \times 10^7$ Ωcm.

0.5 g of a methyl ethyl ketone/methanol (7/3) solution of the copolymer prepared in Example 24 (resin solid content: 10 wt %) and 4.5 g of a urethane acrylate-type ultraviolet curable resin PR-202 (a 50% methyl ethyl ketone solution, manufactured by Mitsubishi Kasei Corporation) were mixed to obtain a solution having a resin solid content of 23 wt %. This solution was cast onto a glass sheet and cured by irradiation with an ultraviolet lamp of 120 W/cm for 12 seconds to obtain a blend film having a thickness of 70 μm. The surface resistance of this blend film was $7.5 \times 10^6$ Ωcm.

We claim:

1. A copolymer having repeating units of the following formula (I) and repeating units of the formula (II), wherein the ratio of (I) to (II) is within a range of from 10:90 to 90:10 by weight ratio, and the number average molecular weight is at least 1,000, or the intrinsic viscosity $\eta_{inh}$ is at least 0.02:

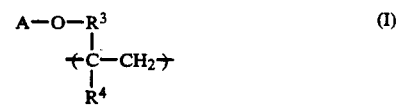

wherein A is a polyester unit having a polymerization degree of from 2 to 200, $R^3$ is a bivalent organic group having an ester, urethane or ketone bond, and $R^4$ is a hydrogen atom or a methyl group,

wherein $R^5$ is a hydrogen atom or a methyl group, and X is a substituent having functionality.

2. A copolymer having repeating units of the following formula (I-1) and repeating units of the formula (II), wherein the ratio of (I-1) to (II) is within a range of from 10:90 to 90:10 by weight ratio, and the number average molecular weight is at least 1,000, or the intrinsic viscosity $\eta_{inh}$ is at least 0.02:

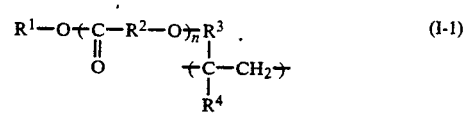

wherein $R^1$ is a $C_{1-20}$ alkyl group or aralkyl group, $R^2$ is a bivalent aliphatic hydrocarbon group, $R^3$ is a bivalent organic group having an ester, urethane or ketone bond, and $R^4$ is a hydrogen atom or a methyl group, and n is from 2 to 200,

wherein $R^5$ is a hydrogen atom or a methyl group, and X is a substituent having functionality.

3. A copolymer having repeating units of the following formula (I-2) and repeating units of the formula (II), wherein the ratio of (I-2) to (II) is within a range of from 10:90 to 90:10, and the number average molecular weight is at least 1,000, or the intrinsic viscosity $\eta_{inh}$ is at least 0.02:

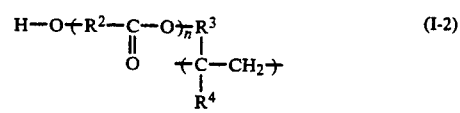

wherein $R^2$ is a bivalent aliphatic hydrocarbon group, $R^3$ is a bivalent organic group having an ester, urethane or ketone bond, R⁴ is a hydrogen atom or a methyl group, and n is from 2 to 200,

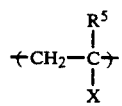
(II)

wherein R⁵ is a hydrogen atom or a methyl group, and X is a substituent having functionality.

4. The copolymer according to claim 1, wherein R³ in the repeating units of the formula (I) is one bivalent organic group selected from the following group of substituents:

—CONH—R⁶—Ar, —CONHCO—, —CO—R-S—OOC—, —CO— and —R⁶—OOC— wherein R⁶ is a direct bond or an alkylene group which may have a branch, and Ar is an arylene group which may have a substituent.

5. The copolymer according to claim 1, wherein X in the repeating units of the formula (II) is at least one substituent selected from the following group of substituents:

an ionic residue containing a quaternary ammonium salt or a metal salt, a nonionic hydrophilic group composed of pyrrolidone or polyethylene oxide having a polymerization degree of from 1 to 200, a C₄₋₂₀ perfluoroalkyl group, a substituent containing from 1 to 200 siloxane bonds, a hydrolyzable silyl group, a benzotriazole-containing substituent, a hindered amine-containing substituent, a benzophenone-containing substituent, a hindered phenol-containing substituent, a phosphate-containing substituent, an aromatic sulfonyl-containing substituent, an aromatic imine-containing substituent, an aromatic nitrogen-containing substituent and an aromatic halogen-containing substituent.

* * * * *